(12) United States Patent
Wiedemann et al.

(10) Patent No.: US 10,045,671 B2
(45) Date of Patent: Aug. 14, 2018

(54) HAND-HELD POWER TOOL SUCTION EXTRACTOR APPARATUS

(71) Applicant: Robert Bosch GmbH, Stuttgart (DE)

(72) Inventors: Christian Wiedemann, Wiernsheim (DE); Michael Weiss, Stuttgart (DE); Carsten Diem, Ludwigsburg (DE); Johannes Schnitzler, Reutlingen (DE); Juergen Bochert, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 971 days.

(21) Appl. No.: 14/454,784

(22) Filed: Aug. 8, 2014

(65) Prior Publication Data

US 2015/0040341 A1 Feb. 12, 2015

(30) Foreign Application Priority Data

Aug. 9, 2013 (DE) .................. 10 2013 215 792

(51) Int. Cl.
  *B25D 17/04* (2006.01)
  *B23Q 11/00* (2006.01)
  *A47L 7/00* (2006.01)
  *F16M 13/02* (2006.01)

(52) U.S. Cl.
  CPC ........ *A47L 7/0095* (2013.01); *B23Q 11/0046* (2013.01); *F16M 13/02* (2013.01)

(58) Field of Classification Search
  CPC ... A47L 7/0095; B23Q 11/0046; B23Q 11/00; F16M 13/02; B25D 17/04

USPC .................................................. 15/344, 339
See application file for complete search history.

(56) References Cited

U.S. PATENT DOCUMENTS 8,997,887 B2 * 4/2015 Furusawa .......... B23Q 11/0046
                                                                173/198
2013/0213683 A1 * 8/2013 Brewster ................ B23Q 11/00
                                                                173/198

FOREIGN PATENT DOCUMENTS

| CN | 102256752 A | 11/2011 |
| CN | 102971114 A | 3/2013 |
| CN | 102985227 A | 3/2013 |
| DE | 3324615 A1 | 5/1984 |
| DE | 103 08 089 A1 | 9/2004 |
| EP | 2363237 | * 9/2011 |

* cited by examiner

*Primary Examiner* — David Redding
(74) *Attorney, Agent, or Firm* — Maginot, Moore & Beck LLP

(57) ABSTRACT

A hand-held power tool suction extractor apparatus comprises at least one fastening unit configured to mount on a hand-held power tool. The at least one fastening unit includes at least one holding element configured to be positioned on the hand-held power tool and at least one fastening element configured to exert a holding force on the at least one holding element. The at least one fastening unit also includes at least one movably mounted position fixing element configured to fix the at least one fastening element.

16 Claims, 12 Drawing Sheets

HAND-HELD POWER TOOL SUCTION EXTRACTOR APPARATUS

This application claims priority under 35 U.S.C. § 119 to patent application no. DE 10 2013 215 792.4 filed on Aug. 9, 2013 in Germany, the disclosure of which is incorporated herein by reference in its entirety.

BACKGROUND

Hand-held power tool suction extractor apparatuses which comprise a fastening unit for mounting on a hand-held power tool, said fastening unit comprising a first connecting region for arranging on the hand-held power tool, are already known.

SUMMARY

The disclosure relates to a hand-held power tool suction extractor apparatus having at least one fastening unit for mounting on a hand-held power tool, said fastening unit comprising at least one holding element for arranging on the hand-held power tool and at least one fastening element for exerting a holding force on the holding element in at least a state in which the holding element is arranged on the hand-held power tool.

It is proposed that the fastening unit have at least one movably mounted position fixing element which is provided for fixing the at least one fastening element. In particular, at least one movably mounted position fixing element is provided for fixing the at least one fastening element relative to a main body of the fastening unit. The at least one position fixing element is preferably formed by a lever, in particular a knee lever and/or a movably mounted detent element. The fastening unit preferably has at least two movably mounted position fixing elements. The at least one position fixing element is preferably mounted movably on a main body of the fastening unit. Furthermore, the at least one position fixing element is captively connected to at least one fastening element. The fastening unit is particularly preferably formed as a separate assembly. In particular, the fastening unit is formed separately from components of the hand-held power tool, such as in particular an auxiliary handle. The fastening unit is in particular formed so as to be spatially and/or materially separate from an auxiliary handle of the hand-held power tool. The auxiliary handle particularly preferably has a separate fastening unit for mounting on the hand-held power tool. In this context, a "fastening unit" is to be understood in particular to mean a unit which is provided for enabling the hand-held power tool suction extractor apparatus to be arranged on a hand-held power tool. This is preferably to be understood to mean a unit by means of which the hand-held power tool suction extractor apparatus is connected to a hand-held power tool during operation. In this context, a "holding element" is to be understood in particular to mean an element which is provided for producing and/or holding a connection. This is preferably to be understood in particular to mean an element which is provided for producing and/or holding a connection by way of a holding force. A "hand-held power tool" is to be understood in particular to mean a machine for processing workpieces, but advantageously a drill, a hammer drill and/or percussion hammer, a saw, a plane, a screwdriver, a milling cutter, a grinder, an angle grinder, a gardening implement and/or a multifunction tool. The fastening element, which is in particular of elastic form, can advantageously compensate tolerances between the hand-held power tool suction extractor apparatus and the hand-held power tool when in a connected state. Furthermore, in this context, a "position fixing element" is to be understood in particular to mean an element which is provided for fixing the at least one fastening element in different positions, in particular by means of a positively locking and/or non-positively locking connection. This is preferably to be understood to mean an element which is provided in particular for fixing the fastening element both when said fastening element is in an unloaded state and also when said fastening element is in a state for applying a holding force. The element is preferably provided for connecting the fastening element, when said fastening element is in an unloaded state and when said fastening element is in a state for applying a holding force, captively to at least one part, which differs from the at least one position fixing element and the at least one fastening element, of the fastening unit. Various position fixing elements that would appear expedient to a person skilled in the art are conceivable; these are however to be understood in particular to be a lever, a ratchet and/or a detent element. "Provided" is to be understood in particular to mean specially configured and/or equipped. The statement that an object is provided for a particular function is to be understood in particular to mean that the object carries out and/or performs said particular function in at least one state of use and/or operation.

By means of the embodiment of the hand-held power tool suction extractor apparatus according to the disclosure, it is possible in particular for a particularly advantageous fastening for the hand-held power tool suction extractor apparatus to be provided, which fastening is particularly stable and strong. Furthermore, it is thereby possible in particular for a fastening to be provided which is particularly easy to handle. In particular, by means of the position fixing element, a fastening can be provided by means of which the hand-held power tool suction extractor apparatus can be displaced or rotated without the need for completely releasing the fastening to the hand-held power tool. In particular, single-handed adjustment of the fastening can preferably be made possible in this way. It can particularly preferably be ensured by means of the position fixing element that the hand-held power tool suction extractor apparatus is held captively on the hand-held power tool without directly falling off.

Furthermore, by means of the position fixing element, a particularly secure and reliable fastening can be provided.

It is preferably proposed that the fastening element is variably adjustable and at least partially delimits at least one first connecting region of the fastening unit. The fastening element is preferably provided for at least partially surrounding the hand-held power tool in at least one plane. Here, the fastening element may in particular bear directly against an outer contour of the hand-held power tool. It would however basically also be conceivable for a further component to be arranged between the fastening element and the hand-held power tool, and for the fastening element to indirectly surround the hand-held power tool. It is preferably the case that a circumference, or at least a partial circumference, of the connecting region can be variably adjusted, in at least one plane, by means of the fastening element. Accordingly, it is preferably possible for a circumference or at least a partial circumference of the connecting region to be adapted to a hand-held power tool. The statement that "the fastening element is variably adjustable" is to be understood in this context in particular to mean that, as regards the fastening element, at least one fastening parameter is variably adjustable at least in a value range. This is preferably to be understood in particular to mean a fastening element in the case of which at least one extent, which is utilized effectively for fastening purposes, of the fastening element can be variably adjusted at least in a value range. This is particularly preferably to be understood in particular to mean a fastening element in the case of which at least one extent of a region, which delimits the connecting region, of the fastening element can be variably adjusted at least in a value range. The fastening element is preferably not in screw form. Furthermore, in this context, a "connecting region" is to be understood in particular to mean a spatial region in which the hand-held power tool is arranged when said hand-held power tool is connected to the hand-held power tool suction extractor apparatus.

The at least one holding element, together with the fastening element, preferably delimits the connecting region in particular along a circumferential direction. The statement that the fastening element "at least partially delimits" the connecting region is to be understood in this context in particular to mean that at least a part, in particular at least 30%, preferably at least 50% and particularly preferably at least 70%, of a material delimitation of the connecting region as viewed in at least one plane is formed by the fastening element. In this way, it is possible in particular for a particularly advantageous variable fastening to be provided for the hand-held power tool suction extractor apparatus. Furthermore, in this way, it is possible for a universal hand-held power tool suction extractor apparatus to be provided which has an, in particular, universal fastening unit. In particular, it can be achieved in this way that the hand-held power tool suction extractor apparatus can be connected to different hand-held power tools. In this way, it is possible in particular for one hand-held power tool suction extractor apparatus to be provided for different appliance and/or weight classes and/or for different appliance types. It is particularly preferably possible in this way for different neck diameters of hand-held power tools to be provided for. In this way, it is possible in particular for appliance-specific suction extractor apparatuses to be replaced. In the case of an embodiment that is separate from an auxiliary handle, it is possible in particular for the auxiliary handle to be adjusted separately, without the hand-held power tool suction extractor apparatus being adjusted at the same time.

It is also proposed that the at least one fastening element is formed at least partially by a fastening strap. The fastening strap is particularly preferably in the form of a detent strap. The fastening strap may however basically also be in the form of some other strap type that would appear expedient to a person skilled in the art, in particular a textile or rubber strap. In this context, a "fastening strap" is to be understood in particular to mean an element which, in an unwound, hypothetically flat, laid-out state, has a length several times greater than a width. The length of the element is preferably in particular at least 2 times, preferably 3 times and particularly preferably 5 times greater than a width of the element. This is preferably to be understood in particular to mean an at least partially flexible and/or elastic element. This is particularly preferably to be understood to mean an element which is provided directly for fastening the hand-held power tool suction extractor apparatus to a hand-held power tool. Here, a "flexible element" is to be understood in particular to mean an element which in particular deflects slightly under a pressure and/or is configured such that a change in shape is possible with little expenditure of force. This is preferably to be understood in particular to mean an element which, in at least one direction of action under the action of gravity, deforms under its own weight where possible. This is particularly preferably to be understood in particular to mean an element which, under the action of gravity, automatically adapts at least partially to the shape of an underlying surface. Furthermore, an "elastic element" is in this case to be understood in particular to mean an element which can be repeatedly deformed without the element being mechanically damaged or destroyed as a result, and which, in particular, automatically seeks to at least approximately regain a basic shape after being deformed. Furthermore, in this context, a "detent strap" is to be understood in particular to mean a fastening strap which has a multiplicity of detent elements on at least one side, in particular on a side spanned by the width and the length of the fastening strap. The detent elements are preferably formed by detent ramps which are oriented perpendicular to the length and which are in particular arranged one behind the other as viewed parallel to the length. When the detent strap is in an unwound, hypothetically flat, laid-out state, the detent ramps are preferably oriented in the same direction. The detent elements particularly preferably cover a major part, in particular at least 50%, preferably at least 60% and particularly preferably at least 80%, of the detent strap. A particularly advantageous fastening element can be provided in this way. Furthermore, particularly simple variable adjustment can be achieved in this way, whereby a high level of operator comfort can be attained. Furthermore, it is possible in particular for a particularly reliable and tough fastening element to be provided in this way. In particular, in the case of an embodiment as a detent strap, it is possible in particular for a fastening strap to be provided with which a particularly stable and strong connection can be realized in a simple manner in terms of construction. In particular, by means of the fastening strap, in particular in the case of a flexible and/or elastic design, mounting is possible even at non-circular fastening locations and/or on non-circular hand-held power tool necks. Furthermore, particularly rapid mounting on the hand-held power tool is possible in this way.

It is furthermore proposed that the at least one fastening unit have at least one second connecting region which is provided for receiving at least one connecting unit and/or at least one suction extractor hose. The hand-held power tool suction extractor apparatus preferably has the at least one connecting unit and/or the at least one suction extractor hose. Here, the connecting unit is in particular provided for connecting at least one suction unit to the at least one fastening unit. The hand-held power tool suction extractor apparatus preferably furthermore has the at least one suction unit. The suction extractor hose is in particular provided for conducting an extraction flow, in particular an extraction air flow. In this context, a "connecting unit" should be understood in particular to mean a unit which is provided for connecting a unit and/or assembly to the fastening unit. This is preferably to be understood to mean a unit which is provided for connecting the suction unit to the fastening unit. By means of the connecting unit, it is preferably possible in particular for a relative parameter, such as in particular a separation distance, between the suction unit and the fastening unit to be adjusted. The connecting unit particularly preferably has at least one adjustment means by which a distance between the at least one fastening unit and the at least one suction unit can be adjusted. By means of the embodiment according to the disclosure, it is possible in particular for a versatile hand-held power tool suction extractor apparatus to be provided. Through the provision of a further connecting region, it is possible in particular to realize particularly simple assembly. In this way, it is advantageously possible in particular to realize simple and rapid assembly of the hand-held power tool suction extractor system.

It is also proposed that the at least one fastening unit have at least one exchangeable adapter element which is provided for adapting at least one size and/or contact geometry of the at least one first connecting region and/or of the at least one second connecting region. It is particularly preferably the case that an adaptation by means of the at least one exchangeable adapter element is realized independently of the fastening element. It is preferably the case that an adaptation of the at least one first connecting region and/or of the at least one second connecting region is realized in particular by exchanging the adapter element. The fastening unit is preferably assigned a multiplicity of exchangeable adapter elements that can be inserted into a main body of the fastening unit in accordance with the application. It is particularly preferable for each of the adapter elements to have an identical connecting mechanism by which the adapter element can be connected to the main body. In this context, an "exchangeable adapter element" is to be understood in particular to mean an element which can be replaced by another associated adapter element. It is possible in particular to realize a particularly simple and uncomplicated adaptation of the at least one first connecting region and/or of the at least one second connecting region in this way. Furthermore, in this way, a degree of adaptability can be continuously enhanced by way of further exchangeable adapter elements.

In this way, it is possible in particular to realize particularly advantageous adaptability. Through the combination of the fastening element and the exchangeable adapter element, it is possible in particular to provide a two-stage system for setting different holding diameters. Furthermore, in this way, it is possible for an entire holding diameter range to be provided for by means of only one adapter element. Furthermore, it is possible for a particularly simple and compact adapter element to be provided in this way.

It is also proposed that the at least one exchangeable adapter element be provided for adapting the at least one first connecting region to a hand-held power tool and/or for adapting the at least one second connecting region to the at least one connecting unit and/or to the at least one suction extractor hose. An adaptation by means of the at least one exchangeable adapter element is preferably realized independently of the fastening element. An adaptation of the at least one first connecting region to a hand-held power tool, and/or of the at least one second connecting region to the at least one connecting unit and/or to the at least one suction extractor hose, is preferably realized in particular by exchanging the adapter element. The fastening unit is preferably assigned a multiplicity of exchangeable adapter elements which, in particular, can be inserted into a main body of the fastening unit in accordance with the hand-held power tool and/or in accordance with the connecting unit and/or in accordance with the suction extractor hose. In this way, it is possible in particular to realize a particularly simple and uncomplicated adaptation of the at least one first connecting region to a hand-held power tool and/or of the at least one second connecting region to the at least one connecting unit and/or to the at least one suction extractor hose.

It is furthermore proposed that the at least one exchangeable adapter element adjoin the first connecting region and the second connecting region. The at least one exchangeable adapter element is preferably arranged between the first connecting region and the second connecting region. The at least one exchangeable adapter element preferably at least partially delimits the first connecting region and the second connecting region. The at least one exchangeable adapter element particular preferably delimits the first connecting region in a region that differs from the fastening element. It is possible in particular for an advantageous fastening unit to be provided in this way. Furthermore, in this way, the first connecting region and the second connecting region can be adapted by means of the at least one exchangeable adapter element. Furthermore, in this way, it is the case in particular that only one adapter element is required for two connecting regions.

It is also proposed that the hand-held power tool suction extractor apparatus have at least one suction unit, having at least one suction opening and having at least one extension element by means of which an extent of the suction unit at least approximately parallel to a main direction of extent of the suction unit can be adjusted. In one embodiment, the extension element is preferably formed by an insertable and/or exchangeable adapter. In particular, it would in this case be possible for an extent of the suction unit to be adjusted through the use of adapters of different length and/or no adapter. In this context, a "suction unit" is to be understood in particular to mean a unit which has at least one suction opening for in particular direct extraction, by suction, of workpiece particles released during a machining process and/or dust and/or dirt from a machining area. This is preferably to be understood to mean a unit which, during operation, is arranged in the surroundings of a machined contact area between the hand-held power tool and a workpiece. The suction unit particularly preferably extends at least partially around a tool implement of the hand-held power tool during operation. In this way, it is possible in particular for the suction unit to be adapted to different tool implement sizes and/or tool implement lengths of the tool implement of the hand-held power tool. Furthermore, in this way, it can be achieved that the hand-held power tool suction extractor apparatus can be used for different tool implements of a hand-held power tool.

It is also proposed that the at least one extension element of the suction unit have at least two sub-regions which are movable relative to one another for the purposes of adjusting an extent of the suction unit. This is preferably to be understood in particular to mean that the sub-regions are in particular movable relative to one another telescopically one inside the other. The sub-regions are preferably formed by tubes, of which in particular at least one is guided in the other. In this way, in particular, extension of the suction unit can be realized in a simple manner from a construction aspect. Furthermore, in this way, extension can be realized in particular without additional components, whereby a high level of operating comfort can be attained. Furthermore, in particular, the suction unit can be advantageously adapted to different tool implement sizes and/or tool implement lengths of the tool implement of the hand-held power tool.

Is also proposed that the hand-held power tool suction extractor apparatus have at least one suction unit which is arranged on an end of the at least one suction extractor hose and which has at least one suction opening for direct extraction, by suction, from a machining area. The suction unit that is assigned to the suction extractor hose preferably differs from the suction unit that is assigned to the connecting unit. The features of the suction units may basically be applied in each case at least partially to the respective other suction unit. As a result of the direct arrangement on the suction extractor hose, it is possible in particular for a number of components to be kept low.

Here, it is not the intention for the hand-held power tool suction extractor apparatus according to the disclosure and/or the hand-held power tool according to the disclosure to be restricted to the usage and embodiment described above. In particular, for the purposes of performing a function described herein, the hand-held power tool suction extractor apparatus according to the disclosure and/or the hand-held power tool according to the disclosure may have a number of individual parts, components and units that differs from a number stated herein.

Further advantages will emerge from the following description of the drawing. The drawings illustrate embodiments of the disclosure. The drawings, the description and the claims contain numerous features in combination. A person skilled in the art will expediently also consider the features individually and combine them to form further meaningful combinations.

DETAILED DESCRIPTION

Figure 1:
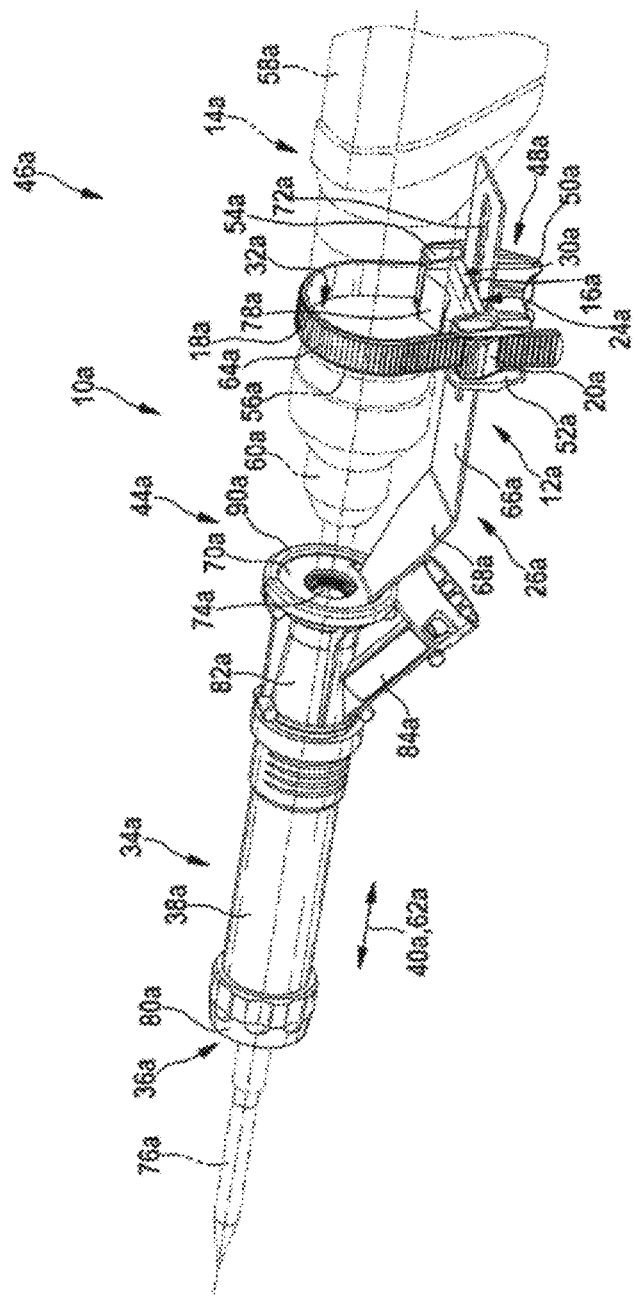
FIG. 1 shows a hand-held power tool suction extractor apparatus according to the disclosure and a hand-held power tool (illustrated by dashed lines), the hand-held power tool suction extractor apparatus having a fastening unit, a connecting unit and a suction unit, in a schematic illustration.

FIG. 1 shows a hand-held power tool suction extractor apparatus 10a according to the disclosure and a hand-held power tool 14a. The hand-held power tool 14a is, for clarity, illustrated merely by way of dashed lines. The hand-held power tool 14a is in the form of a percussion hammer. Other embodiments of the hand-held power tool 14a that would appear expedient to a person skilled in the art are however basically also conceivable.

The hand-held power tool suction extractor apparatus 10a has a fastening unit 12a. The fastening unit 12a is provided for mounting on the hand-held power tool 14a. The hand-held power tool suction extractor apparatus 10a is connected to the hand-held power tool 14a by way of the fastening unit 12a. The fastening unit 12a has a main body 48a. The main body 48a has a main element 50a and two side elements 52a, 54a. The side elements 52a, 54a are arranged on opposite sides of the main element 50a. The main body 48a is of unipartite form. Furthermore, the fastening unit 12a has a second connecting region 32a. The second connecting region 32a is provided for arranging on the hand-held power tool 14a. The hand-held power tool 14a is received in the connecting region 32a during operation of the hand-held power tool suction extractor apparatus 10a. The connecting region 32a receives the hand-held power tool 14a at a neck 56a of the housing 58a behind a tool implement receptacle 60a. It would however basically also be conceivable for the hand-held power tool 14a to be received by the connecting region 32a in some other region that would appear expedient to a person skilled in the art. The connecting region 32a is of completely closed configuration in one plane. In a plane perpendicular to a main direction of extent 62a of the hand-held power tool suction extractor apparatus 10a, the connecting region 32a is surrounded entirely by material of the fastening unit 12a.

Furthermore, the fastening unit 12a has a fastening element 18a. The fastening element 18a is variably adjustable. Furthermore, the fastening element 18a partially delimits the second connecting region 32a of the fastening unit 12a. The second connecting region 32a is delimited, for the most part, by the fastening element 18a. A circumference of the second connecting region 32a in a plane perpendicular to the main direction of extent 62a can be adjusted by way of the fastening element 18a. Furthermore, when the hand-held power tool suction extractor apparatus 10a is in an assembled state, the fastening element 18a partially surrounds the hand-held power tool 14a. The fastening element 18a is formed by a fastening strap. The fastening element 18a is formed by a detent strap. The fastening element 18a has a multiplicity of detent ramps 64a.

Furthermore, the fastening unit 12a has two movably mounted position fixing elements 20a, 22a. The position fixing elements 20a, 22a are provided for fixing the fastening element 18a. The first position fixing element 20a is formed by a detent hook. The first position fixing element 20a is mounted on a side element 52a of the main body 48a in rotatable fashion and under spring loading (in a manner not visible in any more detail). The second position fixing element 22a is formed by a clamping lever. The second position fixing element 22a is formed by a knee lever. The second position fixing element 22a is rotatably mounted, in its center, on the opposite side element 54a of the main body 48a. The fastening element 18a is rotatably mounted on a free end of the second position fixing element 22a. By way of a free end, the fastening element 18a is provided for being locked with detent action between the first position fixing element 20a and the side element 52a of the main body 48a by way of the first position fixing element 20a. The first position fixing element 20a can in this case interlock, with detent action, with any detent ramp 64a of the fastening element 18a. A spring element (not visible in any more detail) which exerts spring load on the first position fixing element 20a presses a detent lug of the first position fixing element 20a into one of the detent ramps 64a. A length of the fastening element 18a from the second position fixing element 22a to the first position fixing element 20a can be adjusted in a manner dependent on which of the detent ramps 64a the first position fixing element 20a interlocks with. When the hand-held power tool suction extractor apparatus 10a is in an assembled state, the fastening element 18a extends from the side element 54a of the main body 48a, around the neck 56a of the hand-held power tool 14a, to the opposite side element 52a of the main body 48a in order to lock there with detent action (FIGS. 1 and 3).

The fastening unit 12a has the further holding element 16a. The holding element 16a is provided for arranging on the hand-held power tool 14a. The fastening element 18a of the fastening unit 12a is provided for exerting a holding force on the holding element 16a when the holding element 16a is arranged on the hand-held power tool 14a. The holding element 16a is pressed against the neck 56a of the hand-held power tool 14a by way of the fastening unit 12a. When the hand-held power tool suction extractor apparatus 10a is in an assembled state, the holding element 16a bears directly against the neck 56a of the hand-held power tool 14a. The second connecting region 32a is delimited, along a circumferential direction, by the holding element 16a and by the fastening element 18a. The neck 56a of the hand-held power tool 14a is thus surrounded entirely by the fastening unit 12a.

Figure 3:
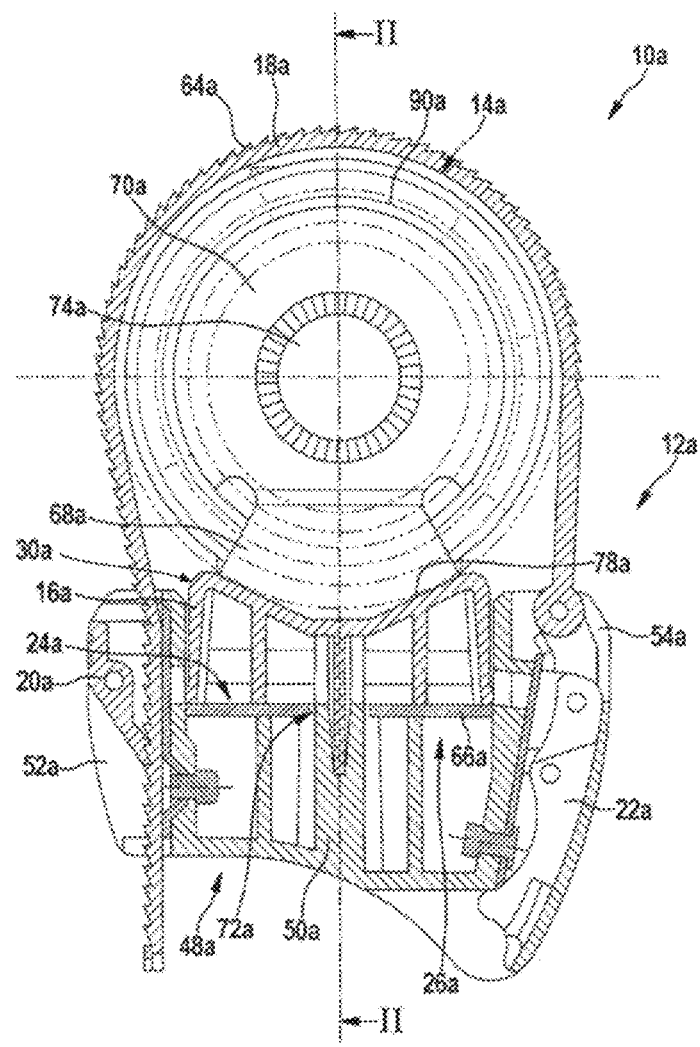
FIG. 3 shows the hand-held power tool suction extractor apparatus according to the disclosure and the hand-held power tool (illustrated by dashed lines) in a schematic sectional illustration along the section line III.

The neck 56a of the hand-held power tool 14a is thus surrounded almost entirely by the holding element 16a and the fastening element 18a (FIG. 3).

Furthermore, the fastening unit 12a has a first connecting region 24a. The first connecting region 24a is provided for receiving a connecting unit 26a. The hand-held power tool suction extractor apparatus 10a has the connecting unit 26a. The connecting unit 26a is provided for connecting a suction unit 34a to the fastening unit 12a. The connecting unit 26a is of plate-like form. The connecting unit 26a has three sub-regions 66a, 68a, 70a which are each formed by planar sub-plates that are angled relative to one another. The connecting unit 26a is of unipartite form. The connecting unit 26a is formed by a bent metal plate. The first sub-region 66a has a rectangular outline and extends parallel to the main direction of extent 62a of the hand-held power tool suction extractor apparatus 10a. The connecting unit 26a is connected to the fastening unit 12a by way of the first sub-region 66a. The connecting unit 26a furthermore has an adjustment means 72a by which a distance between the fastening unit 12a and the suction unit 34a can be adjusted. The first sub-region 66a has the adjustment means 72a. The adjustment means 72a is formed by an elongate recess which extends parallel to the main direction of extent 62a of the hand-held power tool suction extractor apparatus 10a. The recess is composed of a multiplicity of successive interconnected circular sub-recesses. The third sub-region 70a has a circular outline and extends perpendicular to the main direction of extent 62a of the hand-held power tool suction extractor apparatus 10a and thus perpendicular to the first sub-region 66a. The connecting unit 26a is connected to the suction unit 34a via the third sub-region 70a. The third sub-region 70a has a circular recess 74a which is arranged centrally in the third sub-region 70a. When the hand-held power tool suction extractor apparatus 10a is in an assembled state, a tool implement 76a of the hand-held power tool 14a extends through the recess 74a. The second sub-region 68a is of trapezoidal form. Furthermore, the second sub-region 68a is angled relative to the first sub-region 66a and relative to the third sub-region 70a. Furthermore, the second sub-region 68a connects the first sub-region 66a to the third sub-region 70a (FIG. 3).

The fastening unit 12a also has an exchangeable adapter element 30a. The adapter element 30a is provided for adapting a size and/or a contact geometry of the first connecting region 24a and of the second connecting region 32a. The adapter element 30a may be replaced by other adapter elements 30a', 30a" in order thereby to change a size and/or a contact geometry of the first connecting region 24a and of the second connecting region 32a. A size of the second connecting region 32a may be varied both by way of the fastening element 18a and by exchanging the adapter element 30a. On one side, the exchangeable adapter element 30a is provided for adapting the second connecting region 32a to the hand-held power tool 14a. By exchanging the adapter element 30a, it is possible for different types of hand-held power tools to be accommodated. On the other side, the exchangeable adapter element 30a is provided for adapting the first connecting region 24a to the connecting unit 26a. By exchanging the adapter element 30a, it is possible for different types of connecting units to be accommodated. Furthermore, by exchanging the adapter element 30a, it is also possible for other units, for example a suction extractor hose, to be connected. Furthermore, the connecting unit 26a is connected to the fastening unit 12a by means of the adapter element 30a. The adapter element 30a is locked with detent action to the main body 48a of the fastening unit 12a. Here, detent elements that are arranged on the outside of the adapter element 30a interlock, with detent action, with detent recesses that are arranged on inner sides of the side elements 52a, 54a of the main body 48a. Furthermore, the adapter element 30a engages, by way of a pin, through the adjustment means 72a of the first sub-region 66a of the connecting unit 26a into a recess of the main element 50a of the main body 48a. In this way, it is possible in particular to provide an adapter element 30a that can be installed in a particularly simple manner. In particular, when in an installed state, the adapter element 30a is additionally held, and pressed against the connecting unit 26a, by a pressure of the fastening element 18a, said pressure being transmitted via the neck 56a. The exchangeable adapter element 30a adjoins the first connecting region 24a and the second connecting region 32a. The adapter element 30a is arranged between, and separates, the connecting regions 24a, 32a (FIGS. 3, 5, 6 and 7).

The adapter element 30a forms the holding element 16a. Here, the holding element 16a has a contact region 78a that is assigned to the second connecting region 32a. In an installed state, the contact region 78a is provided for bearing against the neck 56a of the hand-held power tool 14a. By virtue of the fact that the holding element 16a is formed by the adapter element 30a, the holding element 16a can be exchanged, whereby the contact region 78a can be adapted to a shape of the neck 56a of the hand-held power tool 14a, whereby advantageous pressure can be generated. In this way, in turn, a reliable holding action can be ensured.

Figure 2:
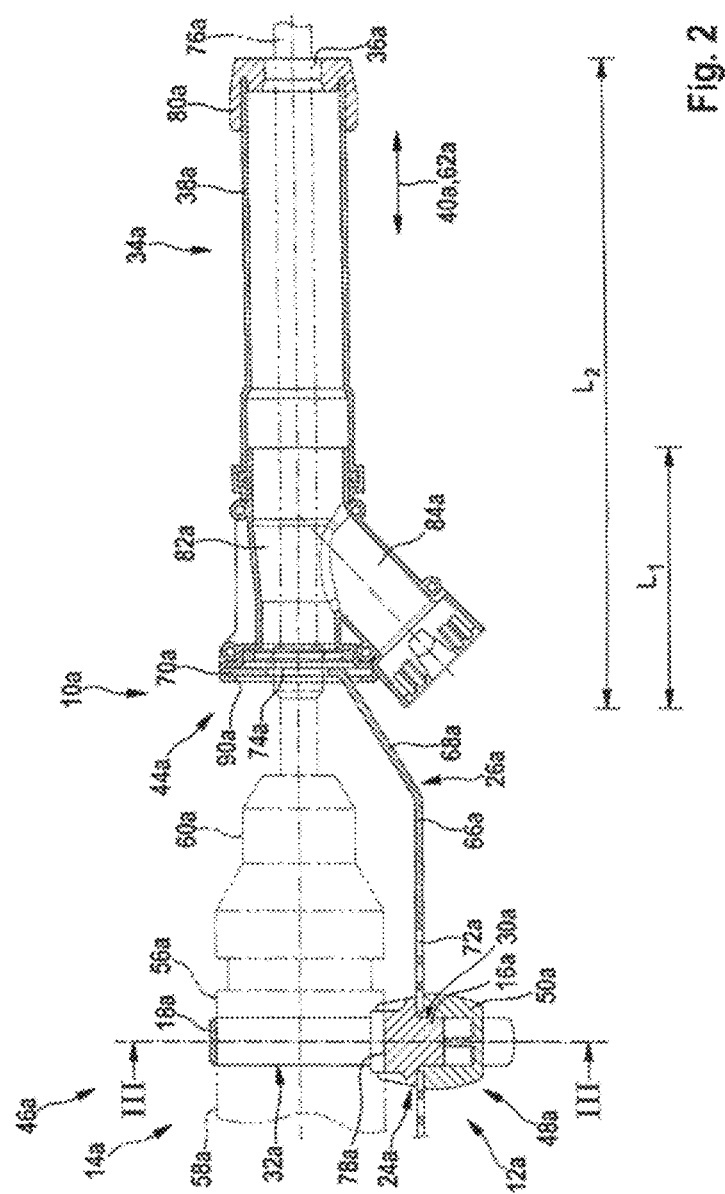
FIG. 2 shows the hand-held power tool suction extractor apparatus according to the disclosure and the hand-held power tool (illustrated by dashed lines) in a schematic sectional illustration along the section line II.
Figure 4:
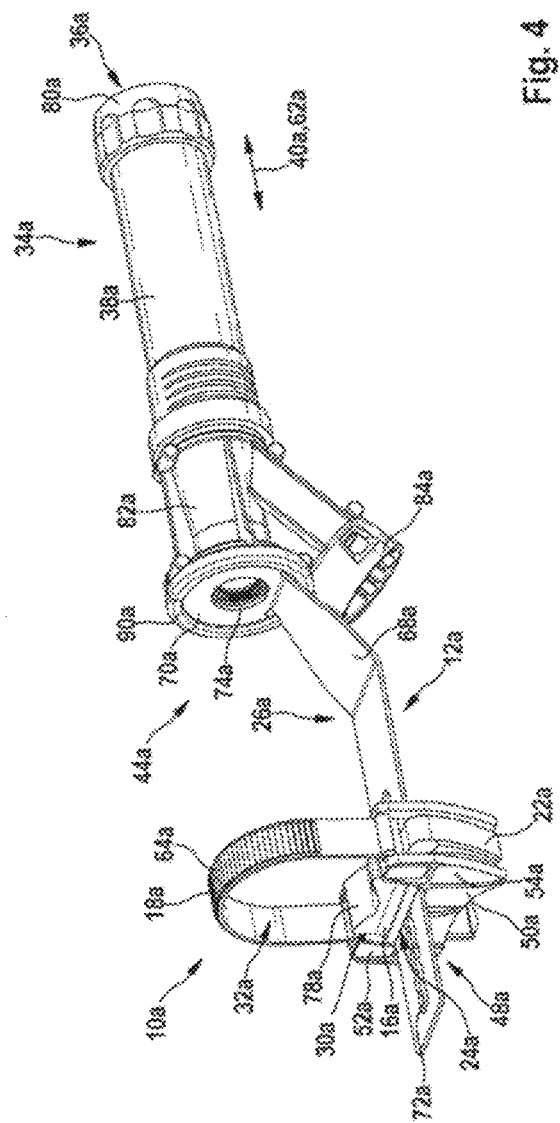
FIG. 4 shows the hand-held power tool suction extractor apparatus according to the disclosure in an alternative schematic illustration.
Figure 5:
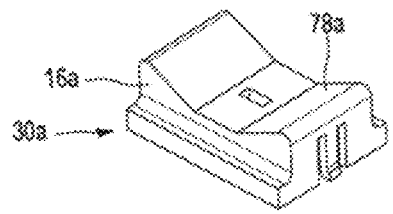
FIG. 5 shows an exchangeable adapter element of the fastening unit of the hand-held power tool suction extractor apparatus according to the disclosure in a schematic illustration.
Figure 6:
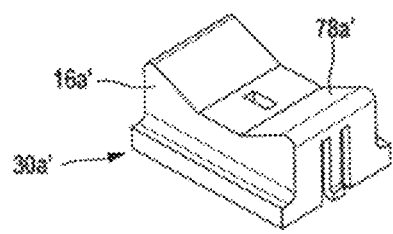
FIG. 6 shows an alternative exchangeable adapter element of the fastening unit of the hand-held power tool suction extractor apparatus according to the disclosure in a schematic illustration.
Figure 7:
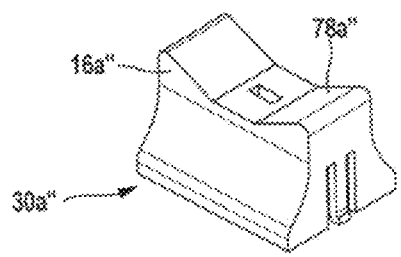
FIG. 7 shows a further alternative exchangeable adapter element of the fastening unit of the hand-held power tool suction extractor apparatus according to the disclosure in a schematic illustration.

Furthermore, the hand-held power tool suction extractor apparatus 10a has the suction unit 34a. The suction unit 34a has a suction opening 36a. Air from a machining area is extracted, by suction, directly through the suction opening 36a. In the process, dust and/or dirt and/or chipped-off material parts are entrained with the air and extracted. Furthermore, the suction unit 34a has a cover 80a which delimits the suction opening 36a. Furthermore, the suction unit 34a has a main body 82a. The main body 82a is of approximately cylindrical form, wherein the main body 82a has a branching suction extractor connector 84a to which a suction extractor hose 86a of a dust extractor 88a can be connected. Furthermore, the main body 82a has, on one end, a receiving region 90a for receiving the third sub-region 70a of the connecting unit 26a. The suction unit 34a can, by means of the receiving region 90a, be rotated relative to the connecting unit 26a in a circumferential direction about the main direction of extent 62a of the hand-held power tool suction extractor apparatus 10a. In this way, in particular, simple rotation as required in the individual situation can be made possible. Furthermore, it is also possible for the fastening unit 12a, owing to the design according to the disclosure, to be easily rotated individually on the hand-held power tool 14a. The tool implement 76a is also received via the receiving region 90a. In the receiving region 90a there is arranged a seal which bears partially against the tool implement 76a in order to prevent a loss of suction force. Furthermore, the suction unit 34a has an extension element 38a. An extent $L_1$, $L_2$ of the suction unit 34a parallel to a main direction of extent 40a of the suction unit 34a can be adjusted by means of the extension element 38a. The extension element 38a is formed by an adapter. The extension element 38a can accordingly be installed between the main body 82a and the cover 80a along the main direction of extent 40a. This results in an extent $L_2$ of the suction unit 34a. If the cover 80a is mounted directly on the main body 82a, this results in an extent $L_1$ of the suction unit 34a. In this way, different lengths of tool implements can be used with the suction unit 34a. Furthermore, use can be made of different extension elements 38a of different lengths in order to thereby be able to theoretically realize an infinite number of different extents of the suction unit 34a (FIGS. 2 and 4).

Figure 8:
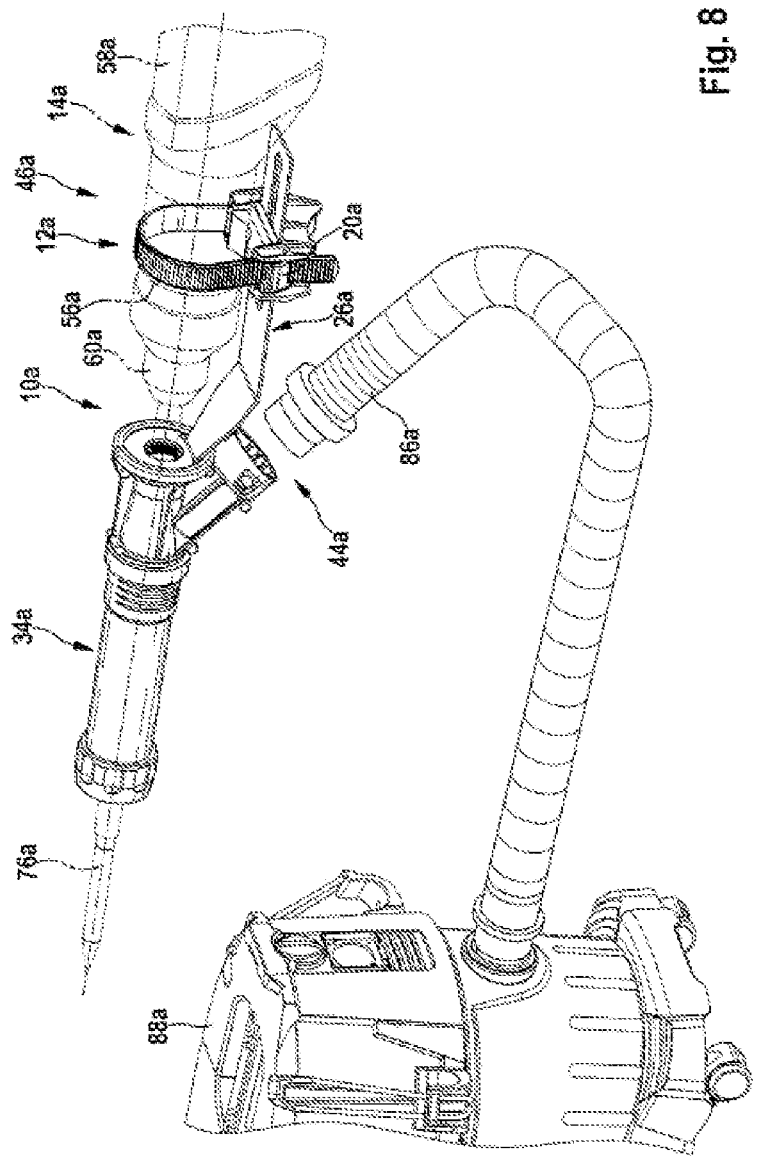
FIG. 8 shows the hand-held power tool suction extractor apparatus according to the disclosure, the hand-held power tool and a dust extractor in a schematic illustration.

The connecting unit 26a and the suction unit 34a form a system 44a. Furthermore, the hand-held power tool 14a and the hand-held power tool suction extractor apparatus 10a form a hand-held power tool system 46a (FIGS. 1 and 8).

During an assembly process, in a first step, a suitable adapter element 30a, 30a', 30a" of the fastening unit 12a is selected. The adapter element 30a, 30a', 30a" is selected in a manner dependent on the hand-held power tool 14a and/or on the connecting unit 26a. Subsequently, the system 44a composed of the connecting unit 26a and the suction unit 34a is connected to the fastening unit 12a. For this purpose, the adapter element 30a is locked with detent action to the main body 48a of the fastening unit 12a, and in the process, simultaneously fixes the adjustment means 72a by way of the pin. By way of the adjustment means 72a, a subsequent distance between the suction unit 34a and the tool implement receptacle 60a of the hand-held power tool 14a can be adjusted. In a subsequent step, the suction unit 34a is adapted to the tool implement 76a. In the case of a long tool implement 76a, the extension element 38a is installed between the main body 82a and the cover 80a of the suction unit 34a. In the case of a short tool implement 76a, the cover 80a is mounted directly on the main body 82a of the suction unit 34a. The hand-held power tool suction extractor apparatus 10a is subsequently pushed over the tool implement receptacle 60a onto the neck 56a of the hand-held power tool 14a. The fastening unit 12a can then be fixed to the hand-held power tool 14a. For this purpose, the second position fixing element 22a of the fastening unit 12a is adjusted into a slackened position, if this has not already been done. The fastening element 18a is subsequently pulled, by way of a free end, under the first position fixing element 20a. Then, to realize a final fixing action, the second position fixing element 22a is moved into a clamped position by being pressed against the main body 48a of the fastening unit 12a. It is thus possible in particular for the fastening unit 12a to be rotated or displaced in the longitudinal direction merely by releasing the second position fixing element 22a, and to be fixed again simply by being pressed on. Even in a released state, the fastening element 18a is captively connected to the second position fixing element 22a. In this way, the fastening unit 12a can be displaced or rotated using one hand. Alternatively, it is also possible for the fastening element 18a to be loosened at the first position fixing element 20a. Even in a loosened state, the fastening element 18a is captively connected to the first position fixing element 20a. A displacement or rotation can be realized in this way. In a further step, it is then possible for the tool implement 76a to be inserted into the tool implement receptacle 60a through the suction unit 34a. In a subsequent step, it is then possible for the suction extraction hose 86a of the dust extractor 88a to be connected to the suction extractor connector 84a. Normal operation can then be started (FIGS. 3 and 8).

FIGS. 9 to 14 show two further exemplary embodiments of the disclosure. The descriptions below are limited substantially to the differences between the exemplary embodiments, wherein, with regard to unchanged components, features and functions, reference may be made to the description of the other exemplary embodiments, in particular of FIGS. 1 to 8. To distinguish between the exemplary embodiments, the letter a in the reference signs of the exemplary embodiment in FIGS. 1 to 8 is replaced by the letters b and c in the reference signs of the exemplary embodiments of FIGS. 9 to 14. With regard to identically designated components, in particular with regard to components with the same reference sign, reference may basically also be made to the drawings and/or the description of the other exemplary embodiments, in particular of FIGS. 1 to 8.

Figure 9:
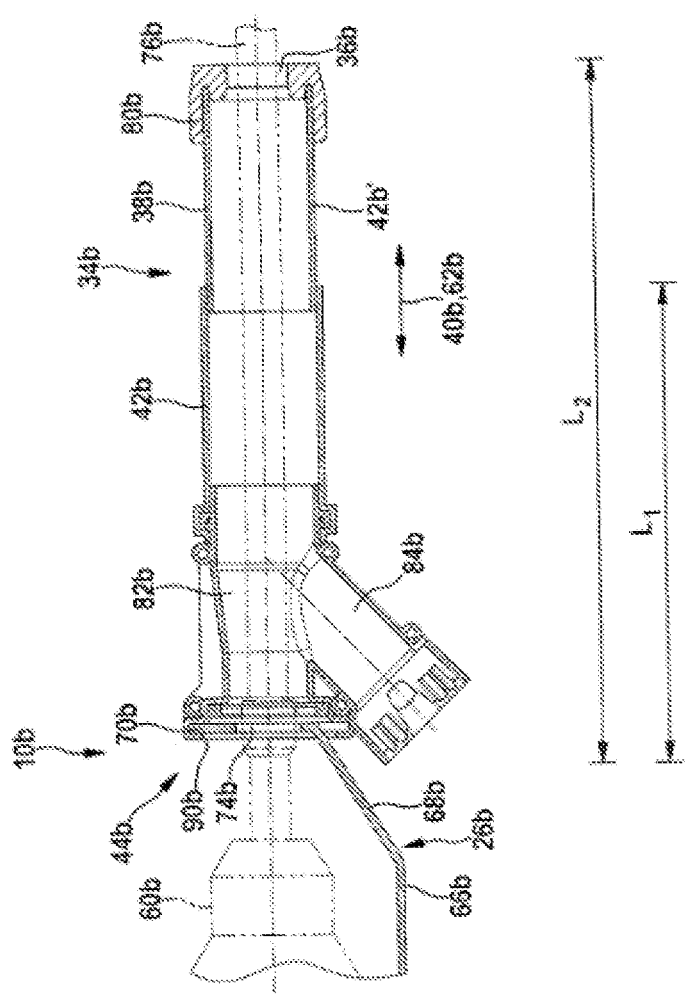
FIG. 9 shows an alternative hand-held power tool suction extractor apparatus according to the disclosure and a hand-held power tool (illustrated by dashed lines) in a schematic sectional illustration.

The second exemplary embodiment of FIG. 9 has, in particular, a fastening unit 12b which is of identical design to the fastening unit 12a of the first exemplary embodiment of FIGS. 1 to 8. The fastening unit 12a and 12b may in this case in particular be used for both exemplary embodiments. The second exemplary embodiment of FIG. 9 basically differs from the first exemplary embodiment of FIGS. 1 to 8 in particular by a design of an extension element 38b.

FIG. 9 shows an alternative hand-held power tool suction extractor apparatus 10b according to the disclosure and a hand-held power tool 14b. For clarity, the hand-held power tool 14b is illustrated merely using dashed lines.

The hand-held power tool suction extractor apparatus 10b has a suction unit 34b. The suction unit 34b has a suction opening 36b. Air from a machining area is extracted, by suction, directly through the suction opening 36b. In the process, dust and/or dirt and/or chipped-off material parts are entrained with the air and extracted. Furthermore, the suction unit 34b has a cover 80b which delimits the suction opening 36b. Furthermore, the suction unit 34b has a main body 82b. The main body 82b is of approximately cylindrical form, wherein the main body 82b has a branching suction extractor connector 84b to which a suction extractor hose 86b of a dust extractor 88b can be connected. Furthermore, the main body 82b has, on one end, a receiving region 90b for receiving a third sub-region 70b of the connecting unit 26b. The suction unit 34b can, by means of the receiving region 90b, be rotated relative to the connecting unit 26b in a circumferential direction about a main direction of extent 62b of the hand-held power tool suction extractor apparatus 10b. A tool implement 76b of the hand-held power tool 14b is also received via the receiving region 90b. In the receiving region 90b there is arranged a seal which bears partially against the tool implement 76b in order to prevent a loss of suction force. Furthermore, the suction unit 34b has an extension element 38b. An extent $L_1$, $L_2$ of the suction unit 34b parallel to a main direction of extent 40b of the suction unit 34b can be adjusted by means of the extension element 38b. The extension element 38b is arranged between the main body 82b and the cover 80b as viewed along the main direction of extent 40b. The extension element 38b, the main body 82b and the cover 80b are fixedly connected to one another. The extension element 38b has two sub-regions 42b, 42b'. The sub-regions 42b, 42b' are movable relative to one another for the purposes of adjusting an extent $L_1$, $L_2$ of the suction unit 34b. The sub-regions 42b, 42b' are each formed by a tube. The second sub-region 42b' is guided in the first sub-region 42b in telescopic fashion. Here, the second sub-region 42b' can, by being rotated relative to the first sub-region 42b, be fixed in different positions in continuously adjustable fashion. Some other fixing facility that would appear expedient to a person skilled in the art would however basically also be conceivable. By means of the extension element 38b, an extent of the suction unit 34b can be adjusted in continuous fashion between an extent $L_1$ of the suction unit 34b and an extent $L_2$ of the suction unit 34b. In this way, it is possible for tool implements of different length to be used with the suction unit 34b. During an assembly process, it is thus possible for the suction unit 34b to be adjusted to a length of the tool implement 76b by way of the extension element 38b by virtue of the sub-regions 42b, 42b' being pushed together or pulled apart.

The third exemplary embodiment of FIGS. 10 to 14 has in particular a fastening unit 12c which is of identical design to the fastening unit 12a of the first exemplary embodiment of FIGS. 1 to 8 and to the fastening unit 12b of the second exemplary embodiment of FIG. 9. Here, the fastening unit 12a, 12b and 12c may in particular be used for all three exemplary embodiments. In particular, the fastening unit 12a, 12b and 12c can be adapted for different applications.

Figure 10:
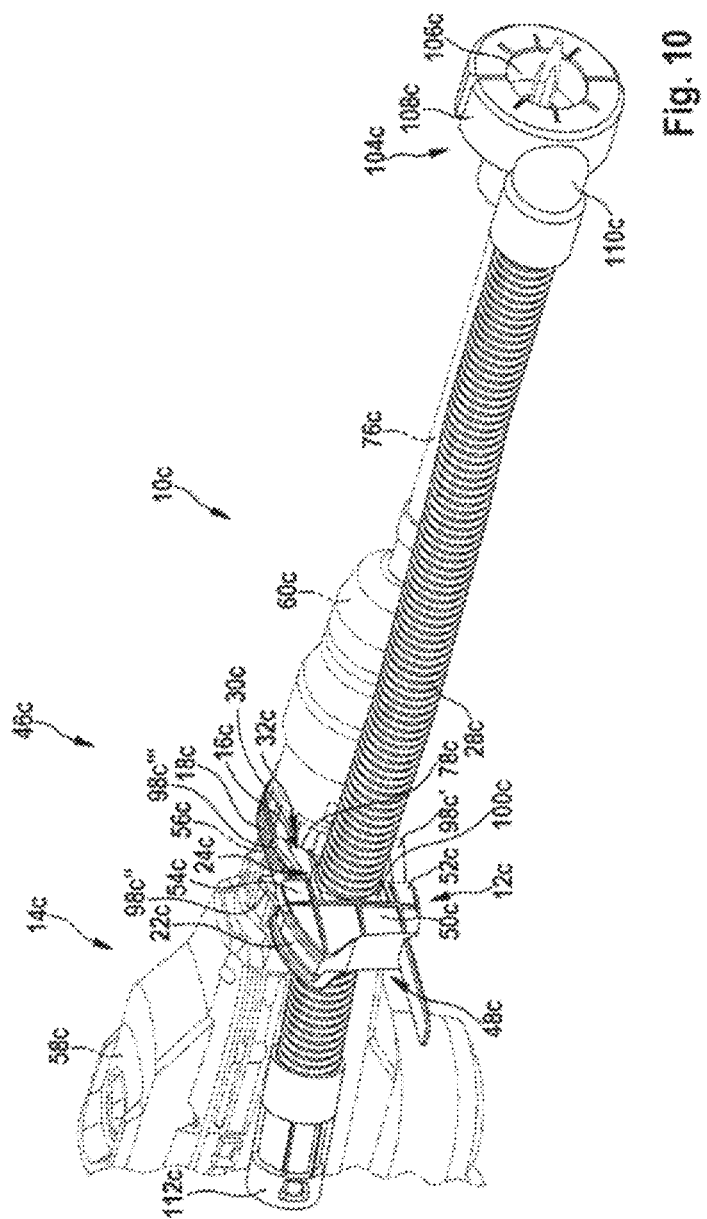
FIG. 10 shows a further alternative hand-held power tool suction extractor apparatus according to the disclosure and a hand-held power tool, the hand-held power tool suction extractor apparatus having a fastening unit, a suction extractor hose and a suction unit, in a schematic illustration.

FIG. 10 shows a further alternative hand-held power tool suction extractor apparatus 10c according to the disclosure and a hand-held power tool 14c.

The hand-held power tool suction extractor apparatus 10c has a fastening unit 12c. The fastening unit 12c has a holding element 16c and a fastening element 18c. The holding element 16c is provided for arranging on the hand-held power tool 14c. Furthermore, the fastening element 18c is provided for exerting a holding force on the holding element 16c when the holding element 16c is arranged on the hand-held power tool 14c. The fastening element 18c is variably adjustable and partially delimits a second connecting region 32c of the fastening unit 12c.

Furthermore, the fastening unit 12c has a first connecting region 24c. The first connecting region 24c is provided for receiving a suction extractor hose 28c. The hand-held power tool suction extractor apparatus 10c has the suction extractor hose 28c. The suction extractor hose 28c is provided for conducting an extraction flow.

Figure 13:
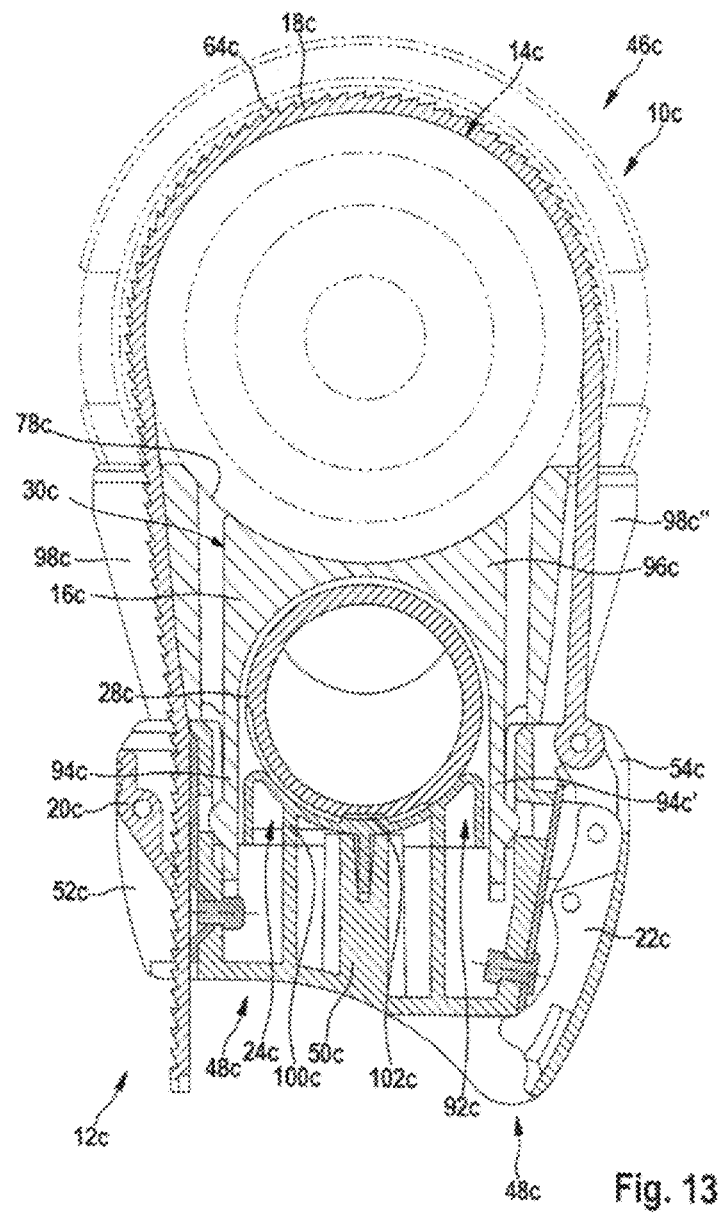
FIG. 13 shows the further alternative hand-held power tool suction extractor apparatus according to the disclosure and the hand-held power tool in a schematic sectional illustration.
Figure 14:
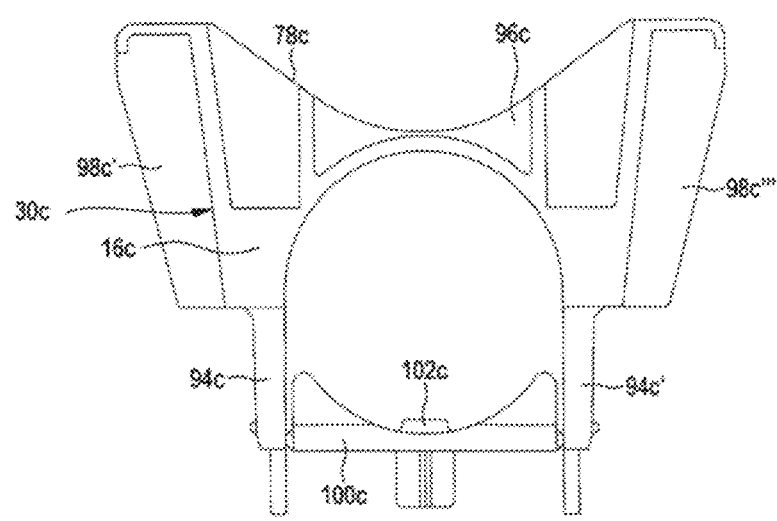
FIG. 14 shows an exchangeable adapter element of the fastening unit of the further alternative hand-held power tool suction extractor apparatus according to the disclosure in a schematic illustration.

The fastening unit 12c furthermore has an exchangeable adapter element 30a. The adapter element 30c is provided for adapting a size and/or a contact geometry of the first connecting region 24c and of the second connecting region 32c. The adapter element 30c may be replaced by other adapter elements in order thereby to change a size and/or a contact geometry of the first connecting region 24c and of the second connecting region 32c. A size of the second connecting region 32c may be changed both by way of the fastening element 18c and also by exchanging the adapter element 30c. On one side, the exchangeable adapter element 30c is provided for adapting the second connecting region 32c to the hand-held power tool 14c. By exchanging the adapter element 30c, it is possible for different types of hand-held power tools to be accommodated. On the other side, the exchangeable adapter element 30c is provided for adapting the first connecting region 24c to the suction extractor hose 28c. By exchanging the adapter element 30c, it is possible for different types and sizes of suction extractor hoses to be accommodated. Furthermore, by exchanging the adapter element 30c, it is also possible for other units, for example a connecting unit, to be connected. Furthermore, the suction extractor hose 28c is connected to the fastening unit 12c by means of the adapter element 30c. The adapter element 30c has a U-shaped receiving region 92c. The receiving region 92c is adapted in terms of its size to a size of the suction extractor hose 28c and is provided for accommodating the suction extractor hose 28c. The receiving region 92c delimits, for the most part, the first connecting region 24c. Furthermore, the receiving region 92c is delimited partially by two webs 94c, 94c', which are situated opposite one another opposite the receiving region 92c, and a main body 96c. The webs 94c, 94c' are connected via the main body 96c. The adapter element 30c is locked with detent action to the main body 48c of the fastening unit 12c. Here, detent elements (not visible in any more detail) that are arranged on the free ends of the webs 94c, 94c' interlock, with detent action, with detent recesses (not visible in any more detail) that are arranged on inner sides of the side elements 52c, 54c of the main body 48c. The exchangeable adapter element 30c adjoins the first connecting region 24c and the second connecting region 32c. The adapter element 30c is arranged between, and separates, the connecting regions 24c, 32c (FIGS. 13 and 14).

The adapter element 30c furthermore has four guide webs 98c, 98c', 98c'', 98c'''. Two of the guide webs 98c, 98c' are arranged on an outer side of the web 94c and extend beyond an outer side of the main body 96c. The two further guide webs 98c'', 98c''' are arranged on an outer side of the web 94c' and likewise extend beyond an outer side of the main body 96c. The guide webs 98c, 98c', 98c'', 98c''' project perpendicularly from the main body 96c of the adapter element 30c, in each case on two sides. When the adapter element 30c is in an installed state in the fastening unit 12c, the fastening element 18c is, on one side, guided between the guide web 98c and the guide web 98c'. On a side situated opposite as viewed perpendicularly to a main direction of extent 62c of the hand-held power tool suction extractor apparatus 10c, the fastening element 18c is likewise guided between the guide web 98c'' and the guide web 98c'''. By means of the guide webs 98c, 98c', 98c'', 98c''', it can be ensured that, when the fastening element 18c is tightened, a pressure of the fastening element 18c acts perpendicularly on the adapter element 30c, and thus tilting can be prevented.

The adapter element 30c forms the holding element 16c. Here, the holding element 16c has a contact region 78c which is assigned to the second connecting region 32c. The contact region 78c is arranged on the main body 96c. In an installed state, the contact region 78c is provided for bearing against the neck 56c of the hand-held power tool 14c (FIG. 14).

Furthermore, the fastening unit 12c has a further adapter element 100c which is assigned to the adapter element 30c. When the hand-held power tool suction extractor apparatus 10c is in an assembled state, the further adapter element 100c is arranged in the receiving region 92c of the adapter element 30c. The further adapter element 100c is arranged on a side of the suction extractor hose 28c which faces away from the main body 96c of the adapter element 30c. The further adapter element 100c bears directly against a main body 48a of the fastening unit 12c. On a side facing away from the main body 48a, the further adapter element 100c has a partially cylindrical outer contour. The partially cylindrical outer contour of the further adapter element 100c is provided for bearing against the suction extractor hose 28c. On the partially cylindrical outer contour, the further adapter element 100c has transverse ribs 102c which project perpendicularly from the outer contour. In an installed state, the transverse ribs 102c project into depressions of the suction extractor hose 28c and thus prevent the suction extractor hose 28c from slipping. In an installed state, the further adapter element 100c interlocks with detent action, in a manner not visible in any more detail, with an inner side of the webs 94c, 94c' of the adapter element 30c. Furthermore, the further adapter element 100c engages, by way of a pin, into a recess of a main element 50c of the main body 48c of the fastening unit 12c. In an installed state, the further adapter element 100c is held in position by a pressure of the fastening element 18c.

Furthermore, the hand-held power tool suction extractor apparatus 10c has the suction unit 104c. The suction unit 104c has a suction opening 106c. Air from a machining area is extracted, by suction, directly through the suction opening 106c. In the process, dust and/or dirt and/or chipped-off material parts are entrained with the air and extracted. Furthermore, the suction unit 104c has a main body 108c which has the suction opening 106c. The main body 108c is of partially cylindrical form, wherein the main body 108c has a branch 110c to which the suction extractor hose 28c is directly connected. Furthermore, at an end facing away from the suction opening 106c, the main body 108c has a receiving region (not visible in any more detail). Via the receiving region (not visible in any more detail), a tool implement 76c is received and guided through the suction unit 104c. In the receiving region there is arranged a seal (not visible in any more detail) which bears partially against the tool implement 76c in order to prevent a loss of suction force (FIG. 10).

Figure 11:
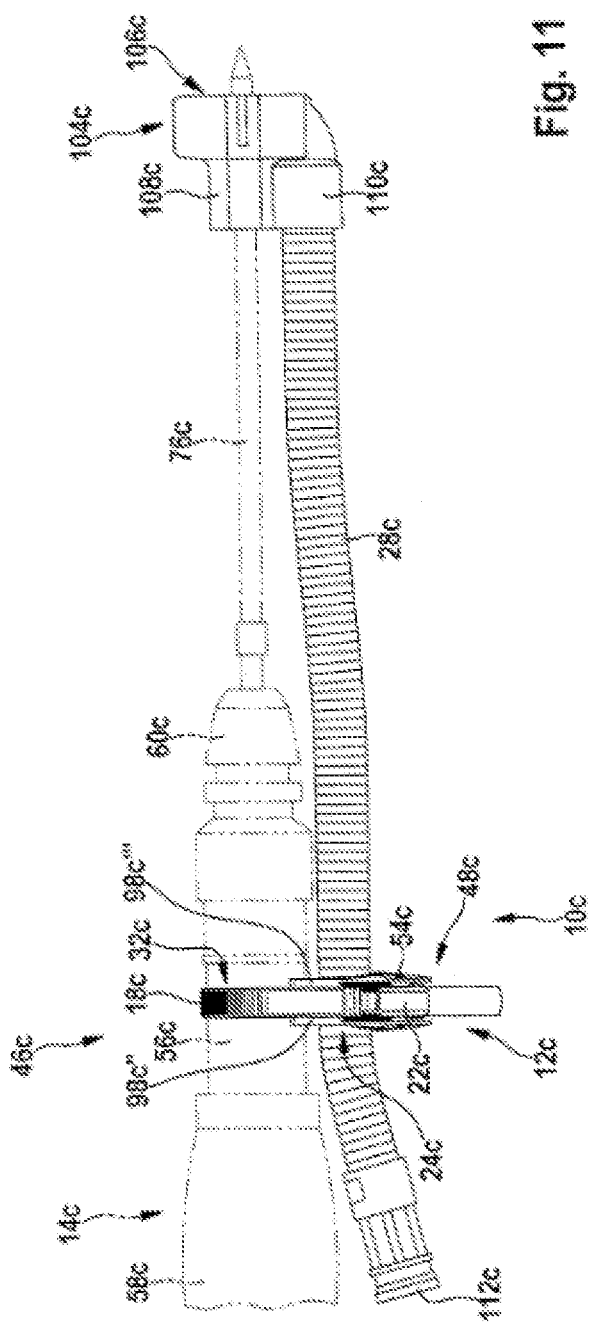
FIG. 11 shows the further alternative hand-held power tool suction extractor apparatus according to the disclosure and the hand-held power tool in an alternative schematic illustration.
Figure 12:
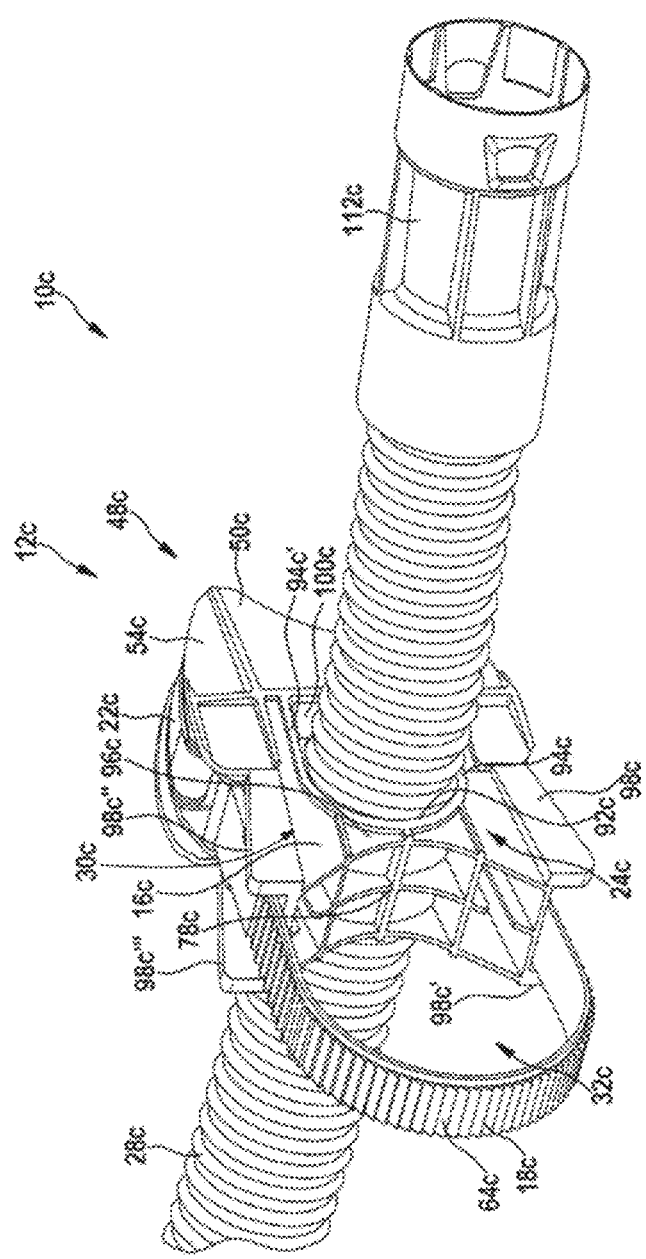
FIG. 12 shows a detail of the further alternative hand-held power tool suction extractor apparatus according to the disclosure in a schematic illustration.

The suction extractor hose 28c is fixedly connected to the suction unit 104c. On a side of the suction extractor hose 28c remote from the suction unit 104c, there is arranged a suction extractor connector 112c to which a suction extractor hose 86c of a dust extractor 88c can be connected (FIGS. 11 and 12).

The hand-held power tool 14c and the hand-held power tool suction extractor apparatus 10c form a hand-held power tool system 46c.

During an assembly process, in a first step, a suitable adapter element 30c of the fastening unit 12c is selected. The adapter element 30c is selected in a manner dependent on the hand-held power tool 14c and/or on the suction extractor hose 86c. Subsequently, the suction extractor hose 28c and the suction unit 104c are connected to the fastening unit 12c. For this purpose, the suction extractor hose 28c is placed into the receiving region 92c of the adapter element 30c. The adapter element 30c is subsequently locked with detent action in the main body 48c of the fastening unit 12c. In the process, the suction extractor hose 28c is clamped in the receiving region 92c such that a movement is substantially inhibited. In an unlocked state, the suction extractor hose 28c can be moved in the receiving region 92c. Accordingly, a position of the suction unit 104c should be oriented relative to the hand-held power tool 14c before locking is performed. The fastening unit 12c can then be fixed to the hand-held power tool 14c. In a further step, the tool implement 76c can then be inserted through the suction unit 34c into a tool implement receptacle 60c of the hand-held power tool 14c. In a subsequent step, the suction extractor hose 86c of the dust extractor 88c can be connected to the suction extractor connector 112c. Normal operation can then be started (FIGS. 11 and 13).

What is claimed is:

1. A hand-held power tool suction extractor apparatus, comprising:
    at least one fastening unit configured to mount on a hand-held power tool and including: (i) at least one holding element configured to be positioned on the hand-held power tool; (ii) at least one fastening element configured to exert a holding force on the at least one holding element; (iii) at least one movably mounted position fixing element configured to fix the at least one fastening element; and (iv) at least one exchangeable adapter element removably mounted on a main body of the fastening unit,
    wherein the holding element and the fastening element define respective portions of at least one second connecting region configured to arrange the suction extractor apparatus on the hand-held power tool, and
    wherein the exchangeable adapter element is configured to adapt a size of the second connecting region and forms the holding element.

2. The hand-held power tool suction extractor apparatus according to claim 1, wherein the at least one fastening element is a fastening strap.

3. The hand-held power tool suction extractor apparatus according to claim 1, wherein the at least one fastening unit further includes at least one first connecting region configured to receive at least one connecting unit.

4. The hand-held power tool suction extractor apparatus according to claim 3, wherein the at least one exchangeable adapter element is further configured to adapt a size of the at least one first connecting region.

5. The hand-held power tool suction extractor apparatus according to claim 4, wherein the at least one exchangeable adapter element is configured to adapt:
    (i) the at least one first connecting region to the at least one connecting unit; and
    (ii) the at least one second connecting region to a corresponding housing portion of the hand-held power tool.

6. The hand-held power tool suction extractor apparatus according to claim 4, wherein the at least one exchangeable adapter element adjoins the at least one first connecting region and the at least one second connecting region.

7. The hand-held power tool suction extractor apparatus according to claim 1, further comprising:

at least one suction unit defining an extent and including: (i) at least one suction opening; and (ii) at least one extension element configured to adjust the extent in a direction approximately parallel to a main direction of the extent.

8. The hand-held power tool suction extractor apparatus according to claim 7, wherein the at least one extension element has at least two sub-regions configured to move relative to each other to adjust the extent.

9. A system, comprising:
a connecting unit;
a suction unit of a hand-held power tool suction extraction apparatus; and
at least one fastening unit configured to mount on a hand-held power tool and including: (i) at least one holding element configured to be positioned on the hand-held power tool; (ii) at least one fastening element configured to exert a holding force on the at least one holding element; (iii) at least one movably mounted position fixing element configured to fix the at least one fastening element; and (iv) at least one exchangeable adapter element removably mounted on a main body of the fastening unit,
wherein the holding element and the fastening element define respective portions of at least one second connecting region configured to arrange the suction extraction apparatus on the hand-held power tool, and
wherein the exchangeable adapter element is configured to adapt a contact geometry of the at least one second connecting region and forms the holding element.

10. The hand-held power tool suction extractor apparatus according to claim 9, wherein the at least one exchangeable adapter element is further configured to adapt a contact geometry of
at least one first connecting region of the at least one fastening unit, the first connecting region configured to receive the connecting unit.

11. The hand-held power tool suction extractor apparatus according to claim 10, wherein the at least one exchangeable adapter element is configured to adapt:
(i) the at least one first connecting region to the connecting unit; and
(ii) the at least one second connecting region to a corresponding housing portion of the hand-held power tool.

12. The hand-held power tool suction extractor apparatus according to claim 10, wherein the at least one exchangeable adapter element adjoins the at least one first connecting region and the at least one second connecting region.

13. A hand-held power tool suction extractor apparatus, comprising:
at least one fastening unit formed separately from an auxiliary handle and configured to mount on a hand-held power tool and including: (i) at least one holding element configured to be positioned on the housing of the hand-held power tool, (ii) at least one flexible fastening element configured to exert a holding force on the at least one holding element, and (iii) at least one first movably mounted position fixing element configured to fix the at least one flexible fastening element wherein the flexible fastening element is rotatably mounted on a second position fixing element.

14. The hand-held power tool suction extractor apparatus according to claim 12, wherein the flexible fastening element has a free end configured to be locked with a detent action of the first position fixing element.

15. The hand-held power tool suction extractor apparatus according to claim 1, wherein:
the exchangeable adapter element includes a first exchangeable adapter element and a second exchangeable adapter element that is formed separately from the first exchangeable adapter element,
the second connecting region has a first size when the first exchangeable adapter element is mounted on the fastening unit and the fastening element is fixed in a first position, and
the second connecting region has a second size when the second exchangeable adapter element is mounted on the fastening unit and the fastening element is fixed in the first position, the first size being different than the second size.

16. The hand-held power tool suction extractor apparatus according to claim 1, wherein the exchangeable adapter element adapts the size of the second connecting region without exchanging the fastening element and without adjusting a position of the fastening element.

* * * * *